United States Patent [19]

Kurita et al.

[11] Patent Number: 4,533,220

[45] Date of Patent: Aug. 6, 1985

[54] INDICATING DEVICE FOR INDICATING DATA WITHIN THE VISUAL FIELD OF MICROSCOPE

[75] Inventors: Hiroyuki Kurita; Yuko Kobayashi, both of Hachiouji; Shinichi Dosaka, Fujino; Juro Kikuchi, Hachiouji; Hiroshi Takase, Hachiouji; Kenichi Harada, Hachiouji, all of Japan

[73] Assignee: Olympus Optical Co., Ltd., Tokyo, Japan

[21] Appl. No.: 491,326

[22] PCT Filed: Oct. 15, 1982

[86] PCT No.: PCT/JP82/00412

§ 371 Date: Apr. 11, 1983

§ 102(e) Date: Apr. 11, 1983

[30] Foreign Application Priority Data

Oct. 15, 1981 [JP] Japan ................ 56-164432

[51] Int. Cl.$^3$ ............... G02B 27/34; G02B 21/00
[52] U.S. Cl. ................... 350/507; 350/174; 350/502
[58] Field of Search ............... 350/507, 511, 502, 514, 350/515, 169–174

[56] References Cited

U.S. PATENT DOCUMENTS 3,671,100 6/1972 Bushman et al. .
4,057,318 11/1977 Schindl .................. 350/502
4,113,354 9/1978 Yamasita et al. ............ 350/286

FOREIGN PATENT DOCUMENTS 1058760 6/1959 Fed. Rep. of Germany ...... 350/286
1103619 3/1961 Fed. Rep. of Germany ...... 350/514
873654 6/1942 France .................. 350/173
28-10660 10/1953 Japan .
51-11029 2/1975 Japan .
50-23619 3/1975 Japan .
51-22440 2/1976 Japan .
51-49720 4/1976 Japan .

Primary Examiner—Jon W. Henry
Attorney, Agent, or Firm—Cushman, Darby & Cushman

[57] ABSTRACT

There is an indicating device constituted so as to be apt to indicate the data such as the magnification ratio of an objective lens, the value of NA, the data or the like in the visual field of a microscope and at the same time to record these data in photograph. This indicating device is provided with a display means (17) able to indicate various sorts of data informations through the data processor (16) and polarizing prisms (10, 11) arranged between the objective lens (9), display means (17), photographing lens (14) and eyepiece (13) to divide the light bundle from the objective lens (9) and the light bundle from the data display means (17) respectively and to make them advance to the eyepiece (13) and photographing lens (14), and the data informations displayed on the display means (17) are imaged on the image forming face (12) inside the eyepiece (13) and on the dry-plate (15). This indicating device may use, instead of the above mentioned polarizing prism, the optical fiber bundle (19) arranged between the data display means (17) and eyepiece barrel (22) to image the data information displayed on the display means (17) on the image forming face (12) inside the eyepiece (13).

1 Claim, 4 Drawing Figures

INDICATING DEVICE FOR INDICATING DATA WITHIN THE VISUAL FIELD OF MICROSCOPE

FIELD OF THE INVENTION

This invention relates to an indicating device able to indicate the data such as the magnification of a lens system, the value of NA, the data or the like within the visual field of a microscope.

BACKGROUND OF THE INVENTION

In the operation of microscopes, an observer needs to confirm the magnification and the value of NA of the lens system to be used upon every exchange of the lens system. Further, according to the necessity, such data as the date or the like have to be photographed on the dry-plate at photographing. Therefore, various indicating devices have been proposed to simplify these operations. However, this kind of conventional indicating device has such a formation wherein a scale or the like is attached to the eyepiece that it is hard to say that it is a flexible indicating device since the indication is fixed. It prevents the smooth operation of microscopes and the information amount is insufficient. Further, such an indicating device as described in Japanese Published Unexamined Patent Application Ser. No. 134816/1980 is so arranged as to put a transparent synthetic resin ring at the image forming position by an objective lens and to illuminate the letters engraved on the ring by a lamp, but it has such a defect as is not smooth in corresponding to the change of informations. An indicating device as described in Japanese published Unexamined Utility Model Application No. 18247/1975 is so arranged with an indicating member formed of liquid crystal in the visual field that it has the defect that the image would become deteriorated by receiving the influence of the indicating member.

Therefore, an object of the present invention is to provide a data indicating device for microscopes able to very clearly present many data informations useful for the operation of microscopes and the observation, record or the like of a sample in the visual field of the eyepiece and to record them in photograph, with a simple operation.

Another object of the present invention is to provide a data indicating device for microscopes wherein the whole data indicating device is integrally assembled in the main body of a microscope to form the whole system compactly.

Still another object of the present invention is to provide a data indicating device for microscopes wherein a part of the data indicating device is arranged in a position independent from the main body of a microscope to enable to use the indicating device of a complicated formation and thereby to enable to increase still more the flexibility of the indication of informations.

DISCLOSURE OF THE INVENTION

The data indicating device, according to the present invention, comprises a data display means arranged outside of an eyepiece barrel and an optical system arranged between an eyepiece and the data display means and capable of projecting the indication displayed by the data display means on the image forming position of a sample image through an objective lens. By this formation, it is possible to display the data informations useful for the operation of microscopes and for the observation and record of the samples very clearly within the visual field of the eyepiece with simple operation, and to record them in photograph.

Further, the above mentioned optical system, according to the present invention, comprises a polarizing prism for dividing the light bundle from the objective lens and the light bundle from the data display means respectively and for making them advance to the eyepiece and a photographing lens, or a prism for making the light bundle from the objective lens and data display means advance to the eyepiece. By this arrangement, the whole data indicating means is able to be integrally assembled in the main body of a microscope and accordingly the whole microscope apparatus is able to be formed very compactly.

Further, the above mentioned optical system, according to the present invention, comprises an optical fiber bundle for leading the light bundle from the data display means to the visual field of the eyepiece. By this arrangement, the data display device is able to be arranged at a position independent from the microscope itself, and accordingly it is possible to provide the data indicating means of complicated formation able to indicate freely more various kinds of data informations.

DESCRIPTION OF THE PREFERRED EMBODIMENTS

The present invention shall be explained in the following in accordance with the appended drawings to describe more detailedly the invention.

Figure 1:
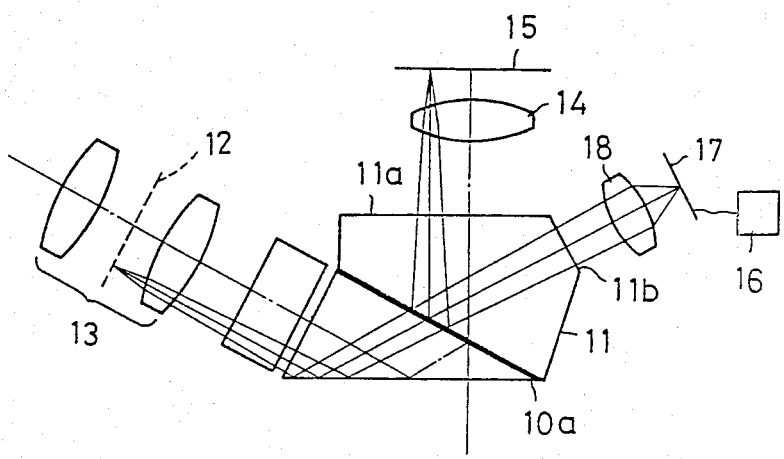
FIG. 1 is a view showing a microscope optical system assembled therein an embodiment of the data indicating device according to the present invention.

In FIG. 1 showing the whole optical system of a microscope assembled therein the data indicating device according to the present invention, 1 denotes a light-source, 2 denotes a collector lens, 3 denotes a field stop, 4 denotes a mirror, 5 denotes a field lens, 6 denotes an aperture stop, 7 denotes a condenser lens, 8 denotes a sample, 9 denotes an objective lens, 10 denotes a deflection prism having an upper-surface 10a formed as the semi-transparent face and capable of dividing the light bundle from the objective lens 9 to make them advance to the eyepiece direction and photographing lens direction, 11 denotes an auxiliary prism cemented on the upper surface 10a of the deflection prism 10 and having a face 11a substantially perpendicular to the optical axis of the objective lens 9 and a face 11b substantially perpendicular to the optical axis of the light bundle from a later mentioned data display means, 12 denotes an image forming face of a sample image by the objective lens 9, 13 denotes an eyepiece of the inside focus type, 14 denotes a photographing lens, 15 denotes a dry-plate, 16 denotes a data processor for processing the data informations such as the objective lens 9, eyepiece 13, photographing device, magnification obtainable from a microscope operator, NA, the kind of the objective lens and eyepiece, the title and number of the sample or the like, 17 denotes a display means connected to the data processor 16 to indicate these data informations by letters and figures, and 18 denotes an image forming lens for the image transmission to image the picture formed on the display means 17 on the image forming face 12 through the prisms 10 and 11 and at the same time to image it on the dry-plate 15 through the photographing lens 14 after having reflected it on the semi-transparent face 10a of the prism 10. The display means 17, the image forming lens 18, the prisms 10 and 11, the eyepiece 13, the photographing lens 14 and the dry-plate 15 constitute the indicating optical system for indicating the data informations within the visual field.

Figure 2:
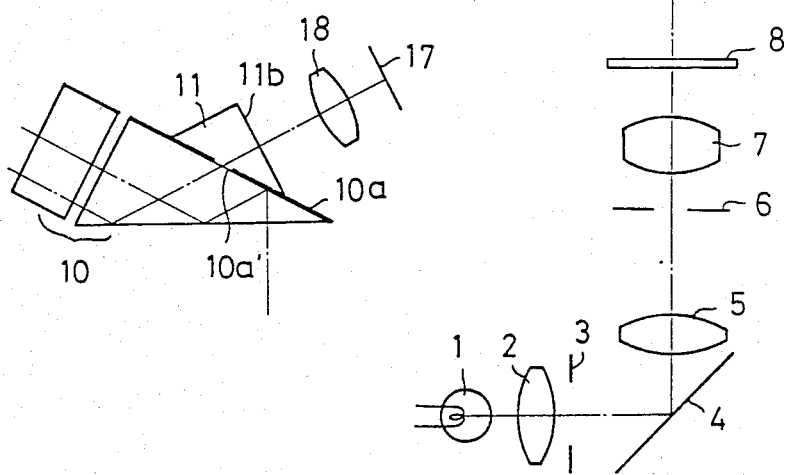
FIG. 2 is a view showing an example of a prism coated with an aluminium film on its face surface in the embodiment of FIG. 1.

The indicating device according to this invention is so formed as described above and the various data informations presented on the display means 17 is so imaged on the image forming face 12 of the sample image formed by the objective lens 9 through the above mentioned indicating optical system that much more abundant data informations than by the conventional ones are obtainable in the condition of looking in at the eyepiece and the pictures are much more clear. Further, because the same data informations are imaged on the dry-plate 15, they are able to be recorded as a photograph. Moreover, because the data informations about the objective lens 9 and the eyepiece 13 are able to be automatically indicated on the display means 17 through the data processor 16 every time they are exchanged, the operations to be exercised by the operator are the exchanging operations of the objective lens 9 and the eyepiece 13 and the input operations according to the necessity of the title of the sample, the date or the like. Accordingly, the whole operation becomes very easy. By the way, in case that the upper surface 10a of the prism 10 is coated with an aluminium film, the light bundle from the image forming lens 18 may be passed through a small opening 10a' arranged on a part of the aluminium film by deleting the aluminium film thereof as shown in FIG. 2.

Figure 3:
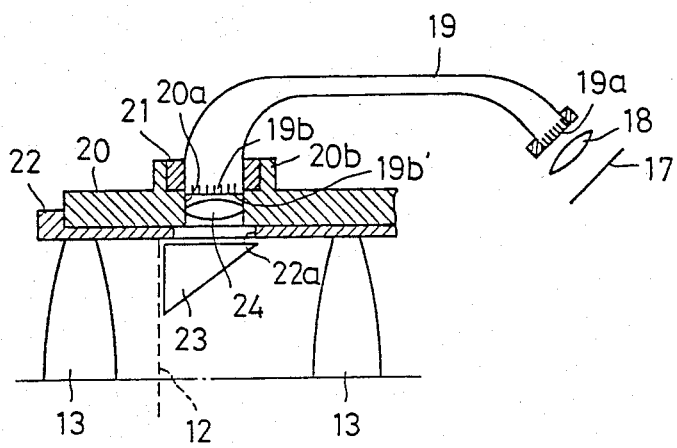
FIG. 3 is a view showing another embodiment of the data indicating device according to the present invention.

In FIG. 3 showing another embodiment according to the present invention, the reference numeral 19 denotes an optical fiber bundle having an entrance end face 19a positioned on the image forming face of the picture on the display means 17 formed by the image forming lens 18, 20 denotes a microscope tube arranged with a hole 20a on a side wall and a circular projection 20b positioned around the hole 20a, 21 denotes a holding ring coupled on the inner side of the circular projection 20b and holding the exit end face 19b of the optical fiber bundle 19 and preventing the penetration of the outer light into the tube 20, 22 denotes an eyepiece barrel for holding the eyepiece 13 having a hole 22a which corresponds to the hole 20a of the tube 20 arranged on the side wall near to the image forming face 12 by the objective lens 9, 23 denotes a prism arranged inside the hole 22a of the eyepiece barrel 22, and 24 denotes an image forming lens arranged inside the hole 20a of the tube 20 to image the picture emerged on the exit end face 19b' of the optical fiber bundle 19 on the image forming face 12 through the prism 23. The barrel 22 and the tube 20 are coupled with each other through the adequate guiding device such as a projection and a groove so that the hole 22a of the eyepiece barrel 22 and the hole 20a of the tube 20 are able to be coupled without fail. In this embodiment, because the display means 17 is able to be arranged at the position independent from the main body of the microscope, a complicated formation is able to be used to increase the flexibility of the indication of informations.

Figure 4:
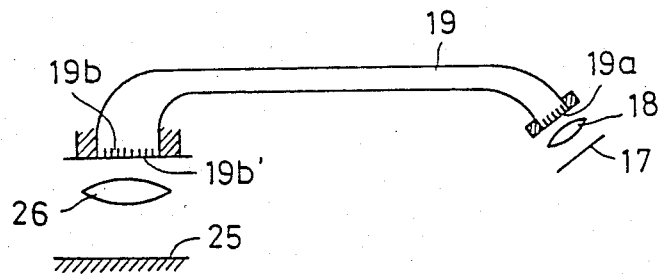
FIG. 4 is a view showing an example wherein the embodiment shown in FIG. 3 is applied to a code data back.

In FIG. 4 showing the example to apply the embodiment shown in FIG. 3 on a recording data back, the reference numeral 25 denotes a dry-plate and 26 denotes an image forming lens to image the picture emerged on the exit end face 19b' of the optical fiber bundle 19 on the dry-plate 25. In this application, the indication amount and the flexibility of the indication are more than in the conventional recording data back.

INDUSTRIAL UTILITY

As described above, the indicating device according to the present invention is very profitable for microscopes, because it is able to provide various data informations useful for the microscope operation, observation recording or the like within the visual field of the eyepiece very abundantly and clearly, and through an extremely simple operation.

We claim:

1. An indicating device for indicating data in a visual field of a microscope comprising: an objective lens, and eyepiece, a light reflecting means arranged obliquely to an optical axis of said objective lens and having a transparent portion at a site located outside of said optical axis; data display means arranged above said light reflecting means; a light leading optical system for leading thereinto an information light from said display means through said transparent portion; and a reflecting surface reflecting a light reflected by said reflecting means and a light led in through said transparent portion to direct them to said eyepiece.

* * * * *